US010929080B2

(12) United States Patent
Chun et al.

(10) Patent No.: US 10,929,080 B2
(45) Date of Patent: *Feb. 23, 2021

(54) EMPATHETIC IMAGE SELECTION (71) Applicant: INTERNATIONAL BUSINESS MACHINES CORPORATION, Armonk, NY (US)

(72) Inventors: Travis W. Chun, Coppell, TX (US); Romelia H. Flores, Keller, TX (US); Marlentae A. Johnson, Irving, TX (US); Michael A. Lau, Arlington, TX (US); Roberto R. Rodriguez, Irving, TX (US); Ronald J. Rutkowski, Irving, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/510,058

(22) Filed: Jul. 12, 2019

(65) Prior Publication Data

US 2019/0332342 A1    Oct. 31, 2019

Related U.S. Application Data

(63) Continuation of application No. 15/693,640, filed on Sep. 1, 2017, now Pat. No. 10,394,511, which is a
(Continued)

(51) Int. Cl.
*G06F 3/0481* (2013.01)
*G06F 3/14* (2006.01)
(Continued)

(52) U.S. Cl.
CPC ............... *G06F 3/14* (2013.01); *G06F 3/011* (2013.01); *G06F 16/5866* (2019.01); *G06N 5/04* (2013.01);
(Continued)

(58) Field of Classification Search
CPC ............ G06F 3/0481; G06F 17/30528; G06K 9/000335; G09G 5/12
See application file for complete search history.

(56) References Cited

U.S. PATENT DOCUMENTS 9,331,970 B2    5/2016   Yuen et al.
9,817,625 B1    11/2017  Chun
(Continued)

FOREIGN PATENT DOCUMENTS

| EP | 2818215 | 12/2014 |
|---|---|---|
| WO | 2005043453 | 5/2005 |
| WO | 2012121160 | 9/2012 |

OTHER PUBLICATIONS

Cao, Jianfang, et al.; An Adaboost-Backpropagation Neural Network for Autoated Image Sentiment Classification; The Scientific World Journal; vol. 2014, Article ID 364649; Aug. 4, 2014; 9 pages.
(Continued)

*Primary Examiner* — Haoshian Shih
(74) *Attorney, Agent, or Firm* — Schmeiser, Olsen & Watts; Aaron Pontikos (57) ABSTRACT

An approach is provided for selecting and displaying one or more images. A determination is made that a user is in a proximity to a digital picture frame. Weather information is received from a weather sensor coupled to the digital picture frame. The weather information specifies a current weather of a geographic location that includes the digital picture frame. Based on the current weather, an emotional state of the user is determined. Based on user profile information corresponding to the user, image(s) included in multiple images are determined to convey the emotional state of the user. Based on the emotional state of the user and the image(s) conveying the emotional state, the image(s) are displayed on a display included in the digital picture frame.

20 Claims, 7 Drawing Sheets

Related U.S. Application Data continuation of application No. 15/298,638, filed on Oct. 20, 2016, now Pat. No. 9,817,625.

(51) Int. Cl.
  *G06N 5/04*   (2006.01)
  *G06F 16/58*  (2019.01)
  *G06F 3/01*   (2006.01)

(52) U.S. Cl.
  CPC .... *G06F 2203/011* (2013.01); *G09G 2354/00* (2013.01); *G09G 2360/144* (2013.01); *G09G 2370/022* (2013.01); *G09G 2370/04* (2013.01); *G09G 2380/16* (2013.01)

(56) References Cited

U.S. PATENT DOCUMENTS

| | | |
|---|---|---|
| 2004/0267816 A1 | 12/2004 | Russek |
| 2012/0143391 A1 | 6/2012 | Gee |
| 2013/0311329 A1 | 11/2013 | Knudson et al. |
| 2015/0193507 A1 | 7/2015 | Rappoport et al. |
| 2015/0222586 A1 | 8/2015 | Ebersman et al. |
| 2015/0242679 A1 | 8/2015 | Naveh |
| 2016/0255162 A1 | 9/2016 | Frieder et al. |
| 2018/0113662 A1 | 4/2018 | Chun |

OTHER PUBLICATIONS

Syta, James M.; List of IBM Patents or Patent Applications Treated as Related; Jul. 12, 2019; 1 page.

FIG. 5

EMPATHETIC IMAGE SELECTION

CROSS REFERENCE TO RELATED APPLICATIONS

This application is a continuation application claiming priority to Ser. No. 15/693,640 filed Sep. 1, 2017, now U.S. Pat. No. 10,394,511 issued Aug. 27, 2019, which is a continuation application claiming priority to Ser. No. 15/298,638 filed Oct. 20, 2016, now U.S. Pat. No. 9,817,625 issued Nov. 14, 2017, the contents of which are hereby incorporated by reference.

BACKGROUND

The present invention relates to managing a presentation of images, and more particularly to selecting and displaying images.

Photographs have the power to preserve a moment in time by capturing light and storing the information it contains. The original process for taking photographs was time and resource intensive and involved several pieces of equipment to light the environment, capture the subject matter, and develop the image. As a result, relatively few people could afford photographs for the first few decades following the invention.

As photographic technology progressed with the creation of film, flash, and instantaneous images, photography became more and more accessible until nearly everyone could afford a personal camera that they could use to create their own pictures. The development process for these images was reduced to as little as an hour. The affordability, ease of use, and reduced development time led many people to create personal photo albums to store their pictures. Creating these albums required time and effort in order to select the right grouping and ordering of pictures throughout an album. These albums could then be easily accessed and shown to others, or simply reviewed individually in order to fondly recall people, places, and experiences in one's life.

The nature of photographic technology and the way in which we use it on a daily basis has been revolutionized in recent years. Digital photo technology allows users to instantly create digital images that do not require development, which greatly reduces the cost of each image and allows users to afford many more pictures as compared to film. Due to the widespread use and availability of the internet, users can now upload, store, and access their photos from anywhere with internet connectivity. Users no longer need bookcases full of albums that occupy valuable space to store their images, and therefore the cost of storage has also been greatly reduced. Finally, the mobile and social technology revolution has given people more incentive than ever to capture and share images with others. All of these technological advances combined have encouraged people to upload about two billion new photos to the internet each day, and this rate is increasing as more people gain access to mobile devices and internet connectivity.

SUMMARY

In one embodiment, the present invention provides a method of selecting and displaying images. The method includes a computer identifying a user and user profile information corresponding to the identified user. The method further includes the computer identifying a sentiment of the user. The method further includes based on the user profile information, the computer determining an association between the identified sentiment of the user and one or more sentiments included in a plurality of sentiments conveyed by a plurality of images. The method further includes the computer determining that one or more images included in the plurality of images convey the one or more sentiments. The method further includes based on the association between the identified sentiment of the user and the one or more sentiments and the one or more images conveying the one or more sentiments, the computer selecting the one or more images from the plurality of images. The method further includes the computer displaying the selected one or more images.

In another embodiment, the present invention provides a computer program product including a computer-readable storage device and a computer-readable program code stored in the computer-readable storage device. The computer-readable program code includes instructions that are executed by a central processing unit (CPU) of a computer system to implement a method of selecting and displaying images. The method includes the computer system identifying a user and user profile information corresponding to the identified user. The method further includes the computer system identifying a sentiment of the user. The method further includes based on the user profile information, the computer system determining an association between the identified sentiment of the user and one or more sentiments included in a plurality of sentiments conveyed by a plurality of images. The method further includes the computer system determining that one or more images included in the plurality of images convey the one or more sentiments. The method further includes based on the association between the identified sentiment of the user and the one or more sentiments and the one or more images conveying the one or more sentiments, the computer system selecting the one or more images from the plurality of images. The method further includes the computer system displaying the selected one or more images.

In another embodiment, the present invention provides a computer system including a central processing unit (CPU); a memory coupled to the CPU; and a computer-readable storage device coupled to the CPU. The storage device includes instructions that are executed by the CPU via the memory to implement a method of selecting and displaying images. The method includes the computer system identifying a user and user profile information corresponding to the identified user. The method further includes the computer system identifying a sentiment of the user. The method further includes based on the user profile information, the computer system determining an association between the identified sentiment of the user and one or more sentiments included in a plurality of sentiments conveyed by a plurality of images. The method further includes the computer system determining that one or more images included in the plurality of images convey the one or more sentiments. The method further includes based on the association between the identified sentiment of the user and the one or more sentiments and the one or more images conveying the one or more sentiments, the computer system selecting the one or more images from the plurality of images. The method further includes the computer system displaying the selected one or more images.

Embodiments of the present invention automatically and quickly select and display images in a user's photo collection, without requiring the user to manually review the photo collection, identify the images the user wants to view, and specify the order in which the images are to be displayed. The automated selection and display of images may be based on the user's recent moods and/or recent experiences, without requiring the user to manually select the images that correspond to an emotional state.

DETAILED DESCRIPTION

Overview

Embodiments of the present invention automatically select and display images on a digital picture frame. In response to a user entering the vicinity of the digital picture frame, embodiments of the present invention automatically recognize the user, load the user's profile, and select and display images on the digital picture frame, where the selection of the images is based on the user's profile, the user's current sentiments, and the current environmental context relevant to the user.

Embodiments of the present invention provide (1) automatic content tagging based on the content of an image, (2) automatic sentiment tagging based on the sentiment typically associated with the content of the image, (3) automatic display of images associated with a specific user in response to that user being within a predefined area in proximity to the digital picture frame, (4) incorporation of social media data into the user's photo display preferences, (5) automatic updating of user profile data based on social media content, (6) adaptive image selection based on the current mood of the user(s) in the predefined area in proximity to the digital picture frame, and (7) mood determination of the environment of the digital picture frame based on audio and video analysis.

Using known image management techniques presents a unique challenge regarding the management and timely display of photos. Currently available technology requires users to manually review their photo collections and identify which images the users want to view and in which order, in much the same way that people did with physical images that were captured on film. Certain companies have begun to offer methods for automatically sorting images based on the image content using image recognition technology, which facilitates users' tasks of sorting through their collections to find particular photos. If users wish to create slideshows of their images, however, the users must manually specify which images to display as well as the time of day, day of the week, etc. on which to display them. Furthermore, users who want to view different collections of images based on their mood and/or recent experiences must manually select the images that correspond to their emotional state and experiences. Since the amount of time and effort required to perform the aforementioned manual review and manual selection of images is significant, many users fail to revisit the photos they have taken, even if the users would enjoy viewing the photos again.

System for Selecting and Displaying Images

Figure 1:
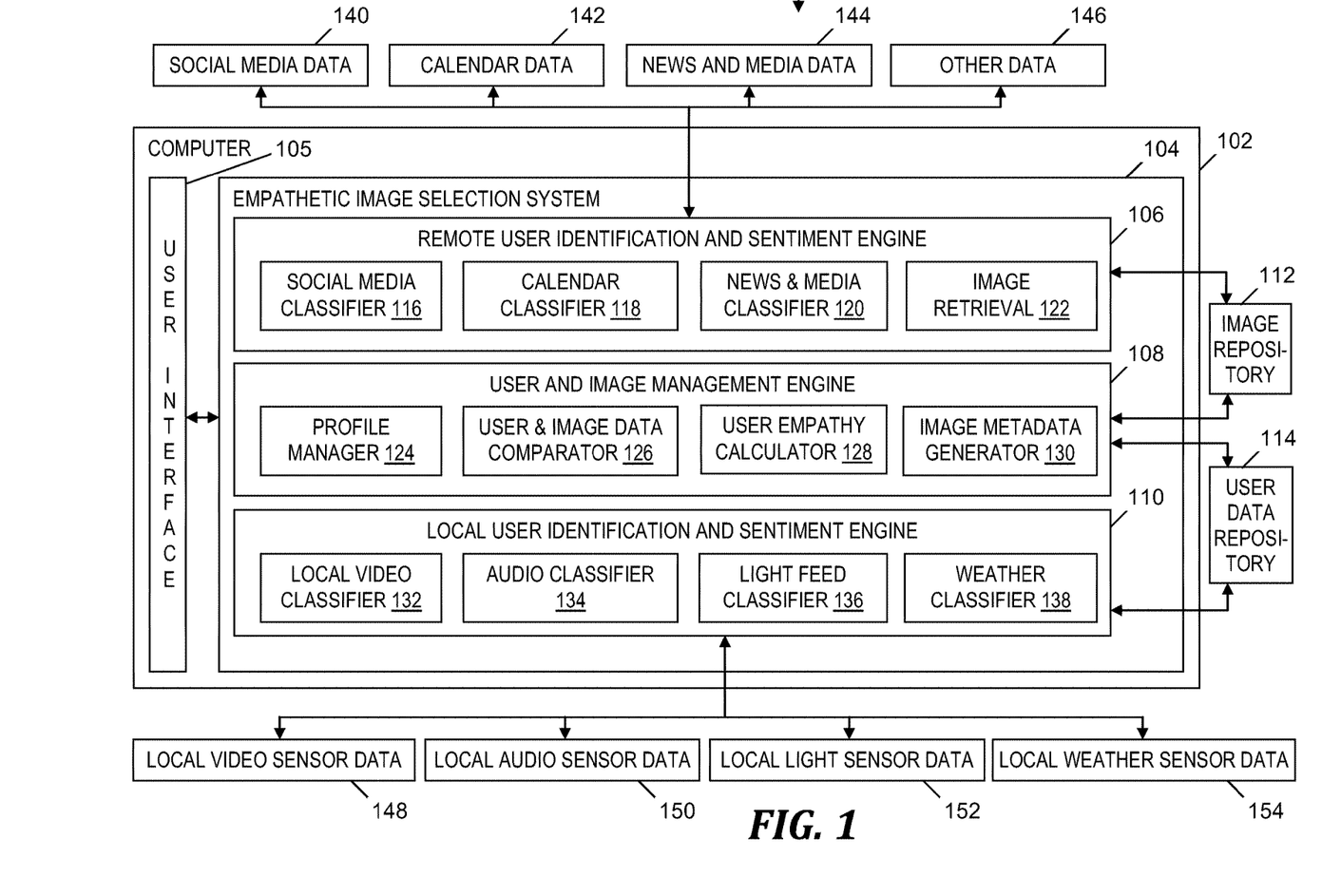
FIG. 1 is a block diagram of a system for automatically selecting and displaying images, in accordance with embodiments of the present invention.

FIG. 1 is a block diagram of a system 100 for automatically selecting and displaying images, in accordance with embodiments of the present invention. System 100 includes a computer 102 which executes a software-based empathetic image selection system 104 which analyzes and retrieves images based on preferences of a user and a sentiment of the user, where the preferences are stored in a user profile. In one embodiment, computer 102 is included in a digital picture frame (not shown) that displays selected images for viewing by one or more users. One or more users interact with empathetic image selection system 104 via a user interface (UI) 105 (e.g., a user interface of a digital picture frame) to set preferences of the one or more users and manage user profiles and images.

Empathetic image selection system 104 includes a remote user identification and sentiment engine 106, a user and image management engine 108, and a local user identification and sentiment engine 110. Remote user identification and sentiment engine 106 accesses images stored in an image repository 112. User and image management engine 108 and local user identification and sentiment engine 110 access user data stored in a user data repository 114. Image repository 112 includes metadata to determine the sentiment and tags of each image included in the plurality of images stored in local storage and/or storage accessed via the Internet or another computer network. User data repository 114 stores user profile data, user preferences, and a last known sentiment of each user identified by empathetic image selection system 104.

Remote user identification and sentiment engine 106 is a software engine that gathers sentiment and image data from remote sources (i.e., sources remote from computer 102, where the sources are in communication with computer 102 via a computer network (not shown)). In one embodiment, the remote sources include one or more social media services, one or more calendar services or applications, one or more news and media services, and repositories of images (e.g., the user's storage locations provided by a network and image search engines).

Remote user identification and sentiment engine 106 includes a social media classifier 116, a calendar classifier 118, a news & media classifier 120, and image retrieval 122.

Social media classifier 116 is a software tool that gathers and analyzes social media data that is authored by the user or that references the user to identify a sentiment of the user.

Calendar classifier 118 is a software tool that gathers and analyzes calendar data managed by the user to identify the sentiment of the user.

News & media classifier 120 is a software tool that uses current event data accessed from online news and media services to determine an overall sentiment at the current time.

Image retrieval 122 is a software tool that retrieves images from external sources, including image search engines and the user's storage locations provided by a network.

User and image management engine 108 is a software engine that manages user profiles, analyzes image content and sentiment, and calculates the current sentiment of the users within the vicinity of the frame. User and image management engine 108 includes a profile manager 124, a user & image data comparator 126, a user empathy calculator 128, and an image metadata generator 130.

Profile manager 124 is a software tool that controls the preferences and other data of the user which is stored in user data repository 114. A user can set the user's preferences controlled by profile manager 124, where the preferences include indications of images or categories of images the user likes, how often images are pulled from social media, etc.

User & image data comparator 126 is a software tool that determines the current users identified by empathetic image selection system 104 and finds commonalities among the user profiles of the current users.

User empathy calculator 128 is a software tool that uses local sensor data and the most recent remote data to determine the user's current sentiment. User empathy calculator 128 calculates a final determination of the sentiment of the user through an analysis of all the data collected by empathetic image selection system 104, which selects image(s) for display, where the selected image(s) correspond to the sentiment of the user.

Image metadata generator 130 is a software tool that analyzes images to determine their content and sentiment, which is stored in image repository 112 for future reference as image metadata.

Local user identification and sentiment engine 110 is a software engine that identifies users within a proximity of a physical digital picture frame which includes computer 102 and identifies the sentiments of the identified users. Local user identification and sentiment engine 110 updates the user data within the user data repository 114 and sends the results to user and image management engine 108. Local user identification and sentiment engine 110 includes a local video classifier 132, an audio classifier 134, a light feed classifier 136, and a weather classifier 138.

Local video classifier 132 is a software tool that identifies the users who are in proximity to the digital picture frame that includes computer 102 (e.g., identifies users who are in the room that includes the digital picture frame) by using data from a video sensor (not shown) coupled to computer 102. Local video classifier 132 also identifies a sentiment of the user by using data from the video sensor.

Audio classifier 134 is a software tool that identifies the users who are in proximity to the digital picture frame (e.g., identifies the users who are in the room in which the digital picture frame is located) through the use of data from an audio sensor (not shown) coupled to computer 102. Audio classifier 134 also identifies a sentiment of the user by using the data from the audio sensor.

Light feed classifier 136 is a software tool that uses data from a light sensor (not shown) coupled to computer 102 to measure the lighting in the room or other environment that includes computer 102. Light feed classifier 136 uses the measurement of the lighting to determine the mood at the current time. For example, a measurement indicating a significant amount of bright light in a room may indicate a lighter, happier mood associated with the room, whereas another measurement indicating dim light in the room may indicate a more somber mood.

Weather classifier 138 is a software tool that ingests data from a weather sensor (not shown) coupled to computer 102 to determine the mood at the current time. For example, if weather classifier 138 receives data from the weather sensor that indicates that it is raining outside, then the mood may be determined to be somber compared to a happier mood determined in response to weather classifier 138 receiving data indicating that is sunny outside.

Remote user identification and sentiment engine 106 gathers sentiment and image data from the remote sources that provide social media data 140, calendar data 142, news and media data 144, and other data 146. Social media data 140 includes data from social media services, including messages and other content posted by the user on a social network website. Calendar data 142 includes data from calendar services and/or applications, where the data includes information about and schedules of events of interest to the user. News and media data 144 includes data from news and media services. Other data 146 includes data that is not included in social media data 140, calendar data 142, and news and media data 144. For example, other data 146 may include images from an image search service.

Local user identification and sentiment engine 110 receives data from one or more sensors (not shown) coupled to computer 102 (e.g., sensors mounted on a digital picture frame that includes computer 102), where the data includes a combination of local video sensor data 148, local audio sensor data 150, local light sensor data 152, and local weather sensor data 154.

Local video sensor data 148 is provided by camera(s) (not shown) and other video identification software and/or hardware (not shown) which gathers optical (i.e., visual) data about users in proximity to computer 102 or the digital picture frame (not shown) that includes computer 102 (e.g., optical data about users in the room that includes the digital picture frame). Local video classifier 132 uses local video sensor data 148 to identify a user who is in proximity to computer 102 or the digital picture frame that includes computer 102 and/or determine a sentiment of the user.

Local audio sensor data 150 is provided by microphone(s) (not shown) and other audio identification software and/or hardware (not shown), which gathers audio data about the users in proximity to computer 102 or a digital picture frame that includes computer 102 (e.g., audio data about users in the room that includes the digital picture frame). Audio classifier 134 uses local audio sensor data 150 to identify a user who is in proximity to computer 102 or the digital picture frame that includes computer 102 and/or determine a sentiment of the user.

Local light sensor data 152 is provided by an ambient light sensor (not shown) coupled to computer 102. Light feed classifier 136 uses local light sensor data 152 to determine the mood or atmosphere of the location (e.g., room) which includes computer 102 or the digital picture frame that includes computer 102.

In one embodiment, local weather sensor data 154 is pulled from one or more weather reporting services by a weather sensor (not shown) coupled to computer 102. Weather classifier 138 uses local weather sensor data 154 to determine the current weather, which is subsequently used to determine a mood or atmosphere of the location (e.g., room) which includes computer 102 or the digital picture frame that includes computer 102.

Figure 2:
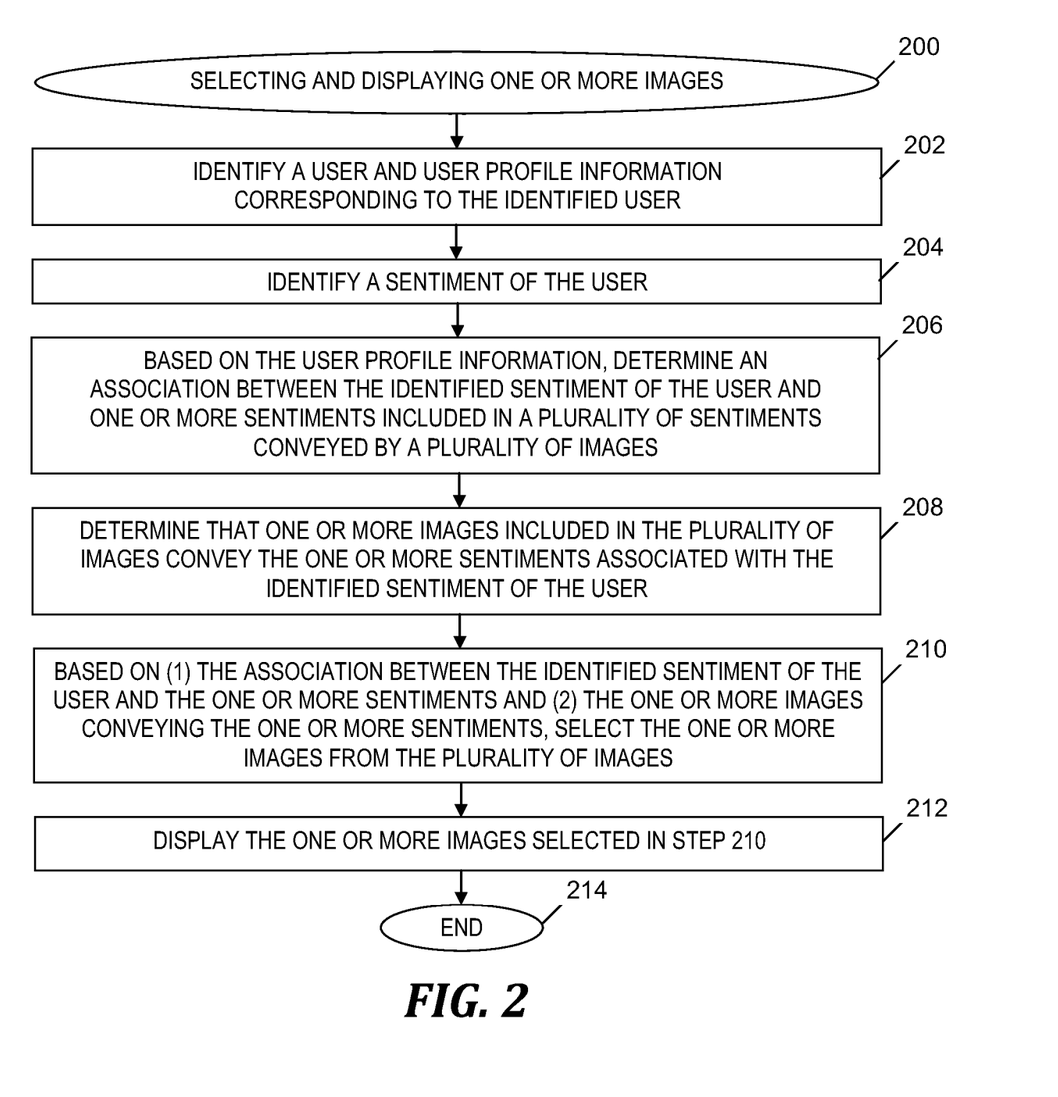
FIG. 2 is a flowchart of a process for automatically selecting and displaying images, where the process is implemented in the system of FIG. 1, in accordance with embodiments of the present invention.
Figure 3:
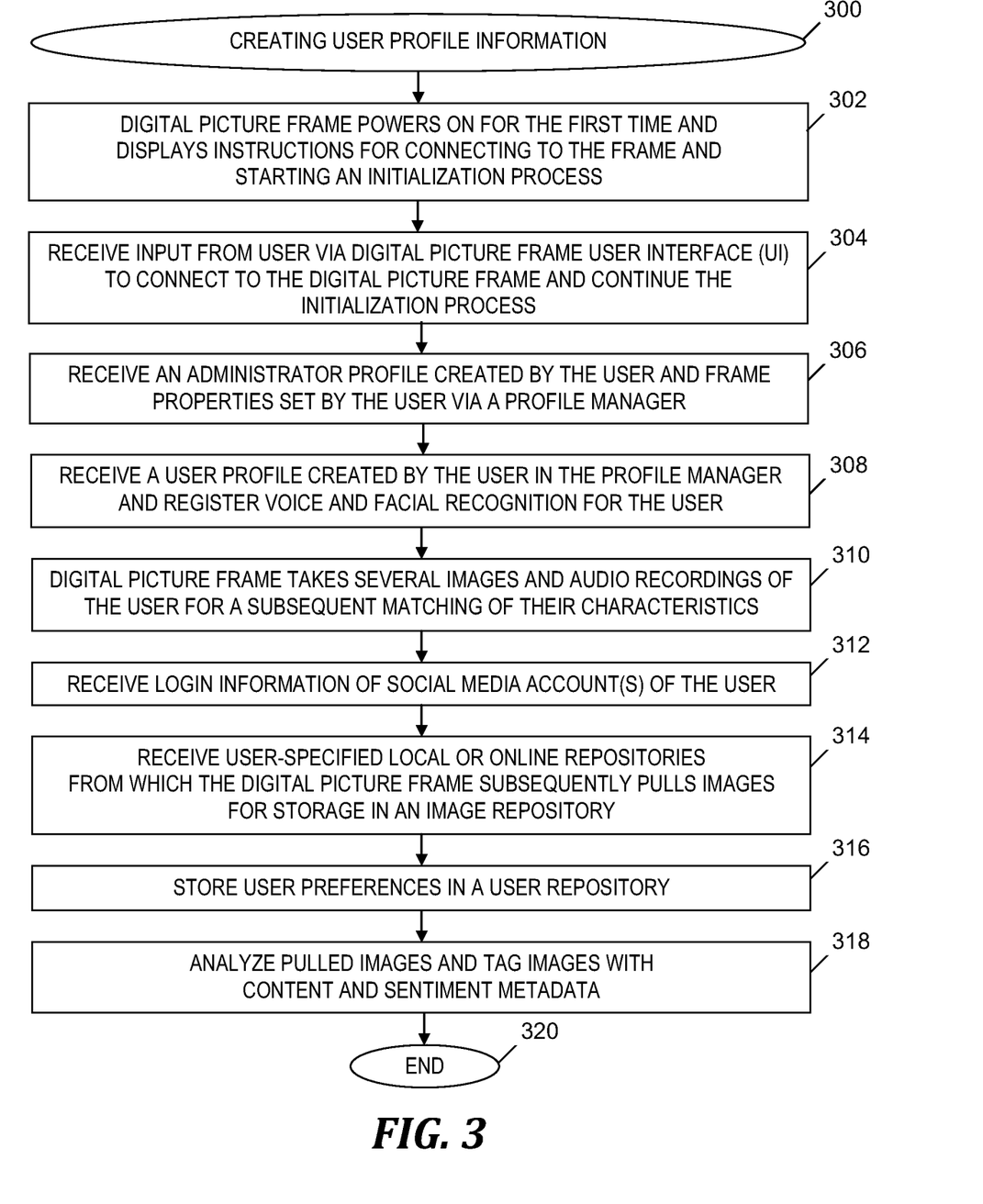
FIG. 3 is a flowchart of a process for creating user profile information which is used in the process of FIG. 2, in accordance with embodiments of the present invention.
Figure 5:
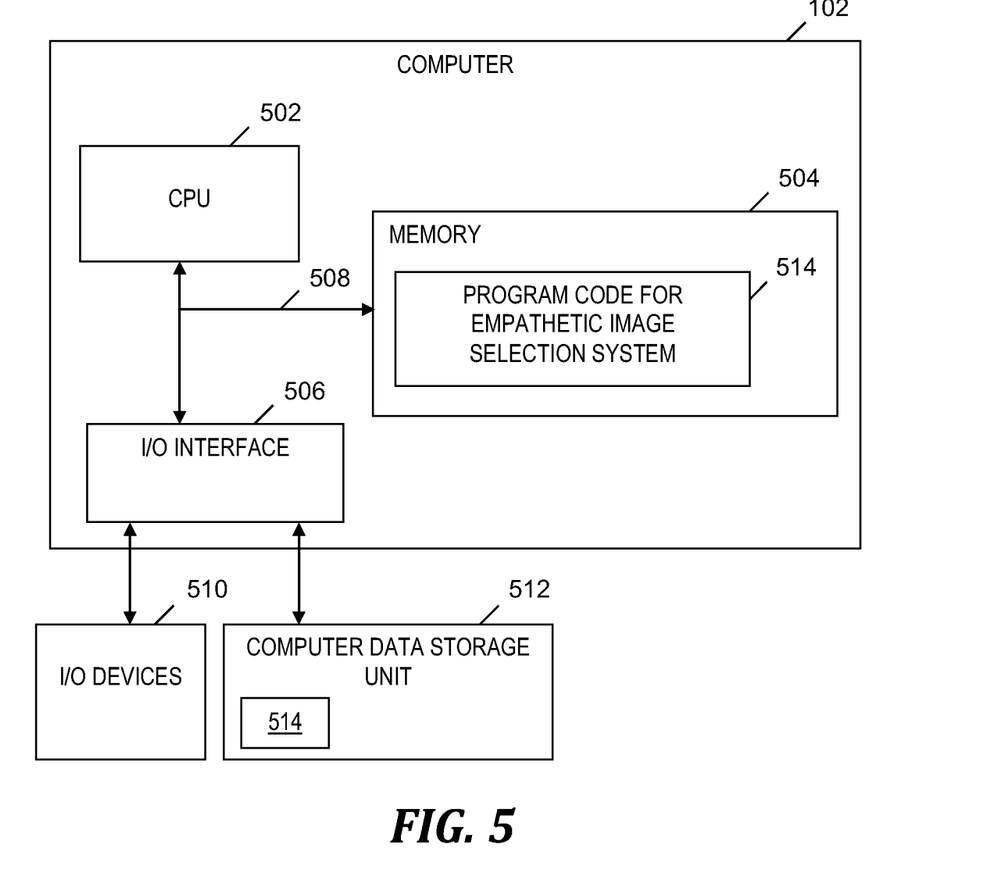
FIG. 5 is a block diagram of a computer that is included in the system of FIG. 1 and that implements the process of FIG. 2, in accordance with embodiments of the present invention.

The functionality of the components shown in FIG. 1 is described in more detail in the discussion of FIG. 2, FIG. 3, and FIG. 5 presented below.

Process for Selecting and Displaying Images

FIG. 2 is a flowchart of a process for automatically selecting and displaying images, where the process is implemented in the system of FIG. 1, in accordance with embodiments of the present invention. The process of FIG. 2 begins at step 200. In step 202, empathetic image selection system 104 (see FIG. 1) identifies a user in a proximity to (i.e., within a predefined distance from) computer 102 or a digital picture frame that includes computer 102 (see FIG. 1). Step 202 also includes empathetic image selection system 104 (see FIG. 1) identifying user profile information corresponding to the identified user. In one embodiment, local user identification and sentiment engine 110 (see FIG. 1) executing local video classifier 132 (see FIG. 1) and audio classifier 134 (see FIG. 1) performs step 202 to analyze local video sensor data 148 (see FIG. 1) and local audio sensor data 150 (see FIG. 1), respectively, to determine whether there is a match between characteristics of video and audio data describing a user and characteristics that had been stored in user data repository 114 (see FIG. 1) prior to the process of FIG. 2 (e.g., by step 308 in FIG. 3, as discussed below).

In step 204, empathetic image selection system 104 (see FIG. 1) identifies a sentiment of the user. The sentiment is a current emotional state of the user, another current cognitive state of the user, or an interest of the user. In one embodiment, empathetic image selection system 104 (see FIG. 1) performs step 204 utilizing user empathy calculator 128 (see FIG. 1), which uses an analysis of remote data sources performed by remote user identification and sentiment engine 106 (see FIG. 1) and an analysis of local data sources performed by local user identification and sentiment engine 110 (see FIG. 1).

The remote data sources include social media data 140 (see FIG. 1), calendar data 142 (see FIG. 1), news and media data 144 (see FIG. 1), and other data 146 (see FIG. 1) (e.g., a set of images resulting from searches the user performed using an image search engine).

The local data sources include local video sensor data 148 (see FIG. 1), local audio sensor data 150 (see FIG. 1), local light sensor data 152 (see FIG. 1), and local weather sensor data 154 (see FIG. 1).

In step 206, based on the user profile information identified in step 202, empathetic image selection system 104 (see FIG. 1) determines an association between (i) the sentiment of the user identified in step 204 and (ii) one or more sentiments included in a plurality of sentiments conveyed by a plurality of images. In one embodiment, determining the association includes empathetic image selection system 104 (see FIG. 1) retrieving associations from a table or other data structure that indicate that a user has indicated a preference to view images conveying a particular sentiment in response to the user having an emotional state that describes the same sentiment or a different sentiment. The retrieved association may also indicate a user's preference to view images that include a particular content in response to the user having a particular sentiment. As one example, the association determined in step 206 indicates that the user prefers to view images conveying the sentiment of happiness in response to the user having the emotional state of feeling happy or sad. As another example, the association determined in step 206 indicates that the user prefers to view images that include favorite people of the user in response to the user having the emotional state of feeling happy, sad, or mad. In one embodiment, user empathy calculator 128 (see FIG. 1) can perform step 206.

In step 208, empathetic image selection system 104 (see FIG. 1) determines that one or more images included the plurality of images convey the one or more sentiments which are associated with the sentiment identified in step 204 according to the association determined in step 206. In one embodiment, user empathy calculator 128 (see FIG. 1) can perform step 208.

In step 210, based on (i) the association determined in step 206 and (ii) the one or more images determined in step 208, empathetic image selection system 104 (see FIG. 1) selects the one or more images from the plurality of images. In one embodiment, user empathy calculator 128 (see FIG. 1) can perform step 210.

In step 212, empathetic image selection system 104 (see FIG. 1) displays the one or more images selected in step 210 for viewing by the user. After step 212, the process of FIG. 2 ends at step 214.

In an alternate embodiment, step 204 identifies a mood of an environment in proximity to the digital picture frame that includes computer 102 (see FIG. 1), step 206 determines an association between the identified mood of the environment, and step 210 selects one or more images conveying one or more sentiments that correspond to the mood of the environment based on the association determined in step 206.

In another alternate embodiment, local user identification and sentiment engine 110 (see FIG. 1) determines that the user and one or more additional users are in proximity to computer 102 (see FIG. 1) or a digital picture frame that includes computer 102 (see FIG. 1). In response to the user and the one or more additional users being in proximity to computer 102 (see FIG. 1) or the digital picture frame that includes computer 102 (see FIG. 1), user empathy calculator 128 (see FIG. 1) identifies the sentiment of the user in step 204 and identifies one or more sentiments (i.e., one or more emotional or other cognitive states) of the one or more additional users, respectively. Based on an application of steps 206 and 208 to the aforementioned user and the one or more additional users, in step 210, empathetic image selection system 104 (see FIG. 1) selects image(s) that convey a sentiment that corresponds to the sentiments of the majority of the users who were determined to be in proximity to computer 102 (see FIG. 1) or the digital picture frame.

Creating User Profile Information

FIG. 3 is a flowchart of a process for creating user profile information which is used in the process of FIG. 2, in accordance with embodiments of the present invention. The process of FIG. 3 precedes the process of FIG. 2 and starts at step 300. In step 302, a digital picture frame (also known as "the frame") that includes computer 102 (see FIG. 1) powers on for the first time and displays instructions for connecting to the frame and for starting an initialization process.

In step 304, empathetic image selection system 104 (see FIG. 1) being executed by the digital picture frame receives input from a user via user interface 105 (see FIG. 1) to connect to the frame and continue the initialization process.

In step 306, empathetic image selection system 104 (see FIG. 1) being executed by the digital picture frame receives an administrator profile created by the user and properties of the frame which are set by the user via profile manager 124 (see FIG. 1).

In step 308, empathetic image selection system 104 (see FIG. 1) being executed by the digital picture frame receives a user profile created by the user via user interface 105 (see FIG. 1). Step 308 also includes empathetic image selection system 104 (see FIG. 1) registering voice recognition and facial recognition of the user and storing the voice and facial recognition data in user data repository 114. In one embodiment, profile manager 124 (see FIG. 1) can perform step 308.

In step 310, video and audio recording hardware features included in the digital picture frame take several images of the user and make audio recordings of the user's speech for a subsequent matching of the characteristics of the images and audio recordings to local video sensor data 148 (see FIG. 1) and local audio sensor data 150 (see FIG. 1), where the matching is a basis for identifying a user who is in proximity to the digital picture frame. Also in step 310, empathetic image selection system 104 (see FIG. 1) stores the characteristics of the images of the user and the characteristics of the audio recordings of the user's speech in user data repository 114 (see FIG. 1). In one embodiment, profile manager 124 (see FIG. 1) performs the storing of the characteristics in step 310.

In step 312, empathetic image selection system 104 (see FIG. 1) being executed by the digital picture frame receives login information of one or more social media accounts of the user and stores the login information in user data repository 114 (see FIG. 1). In one embodiment, profile manager 124 (see FIG. 1) performs step 312.

In step 314, empathetic image selection system 104 (see FIG. 1) being executed by the digital picture frame receives user-specified local and/or online data repositories and subsequently, the digital picture frame, as instructed by empathetic image selection system 104 (see FIG. 1), pulls images from the user-specified data repositories and stores the pulled images in image repository 112 (see FIG. 1). In one embodiment, image retrieval 122 (see FIG. 1) performs step 314.

In step 316, empathetic image selection system 104 (see FIG. 1) stores user preferences in user data repository 114 (see FIG. 1). The user preferences include (1) the content of images that the user prefers to view in response to the user having a specified sentiment (i.e., a specified emotional or other cognitive state), (2) the sentiment conveyed by images that the user prefers to detect in response to the user having a specified sentiment, (3) how often the digital picture frame is permitted by the user to pull images from social media in step 314, etc. In one embodiment, profile manager 124 (see FIG. 1) performs step 316.

In step 318, empathetic image selection system 104 (see FIG. 1) analyzes the images pulled in step 314 and tags the pulled images with metadata that specifies the content of the images and the respective sentiments conveyed by the images. Subsequent to step 318, empathetic image selection system 104 (see FIG. 1) stores the metadata tags in image repository 112 (see FIG. 1). In one embodiment, image metadata generator 130 (see FIG. 1) performs step 318. After step 318, the process of FIG. 3 ends at step 320.

EXAMPLE

Figure 4A:
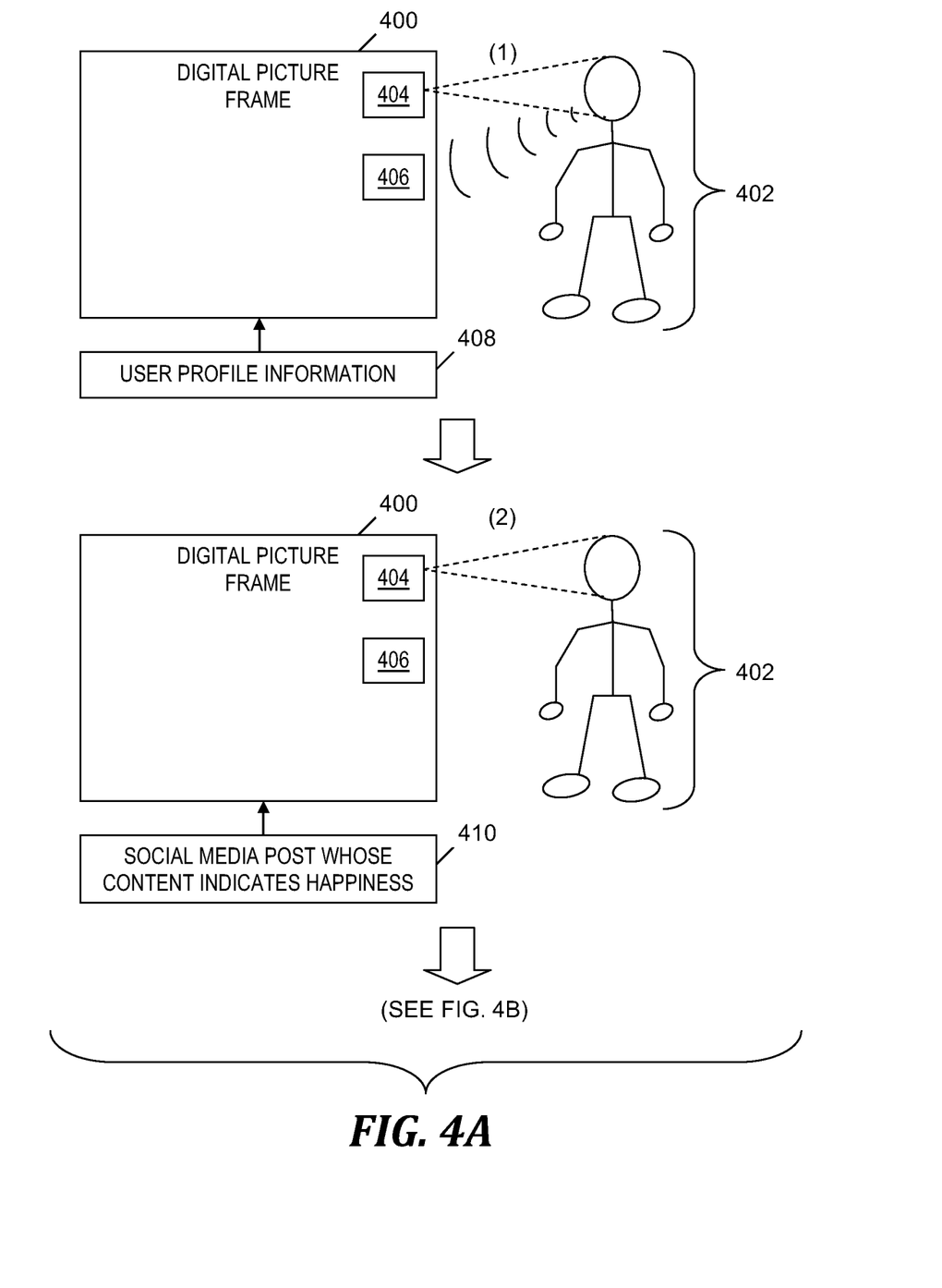
FIGS. 4A-4C depict an example of automatically selecting and displaying images, which utilizes the process of FIG. 2, in accordance with embodiments of the present invention.
Figure 4B:
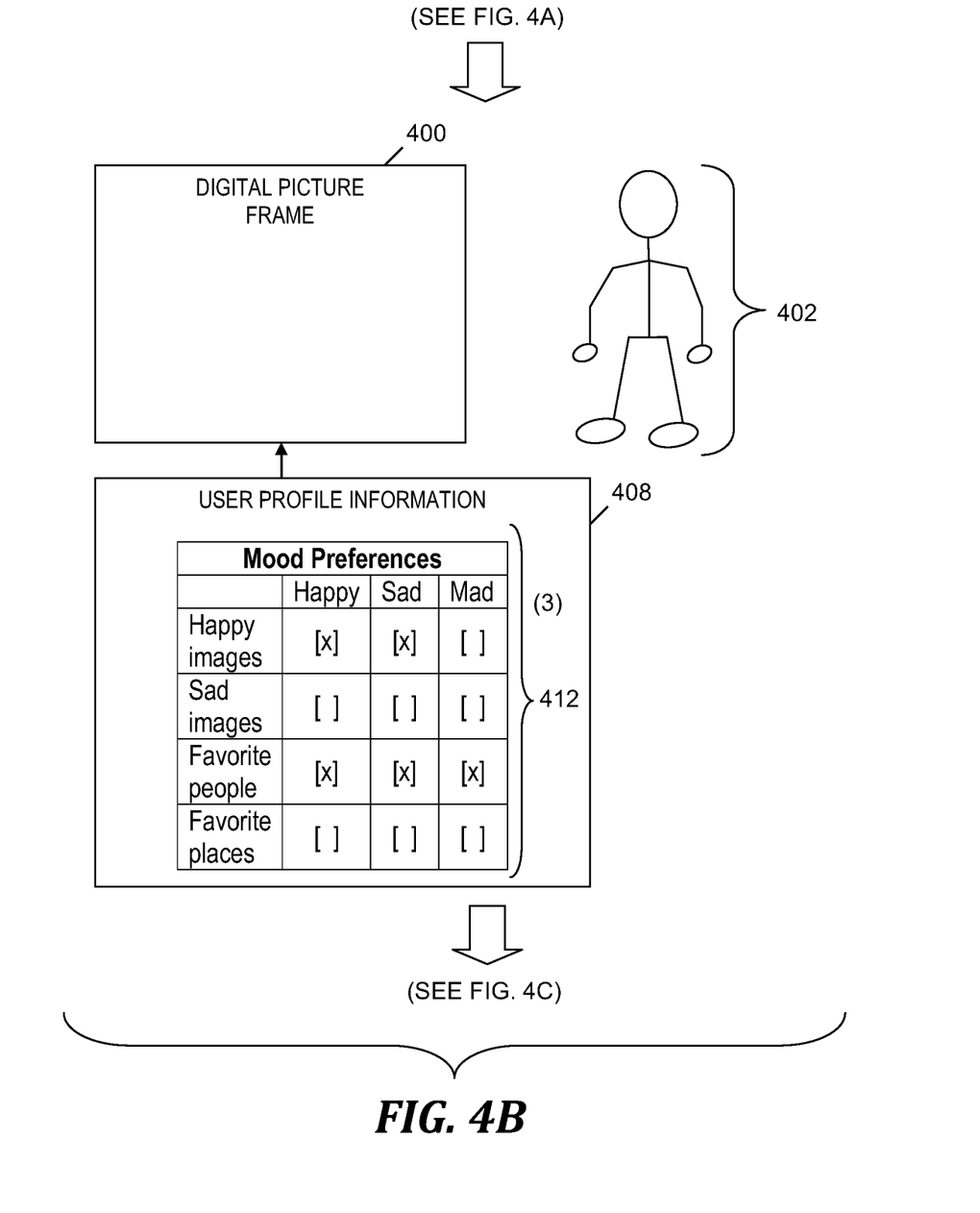
Figure 4C:
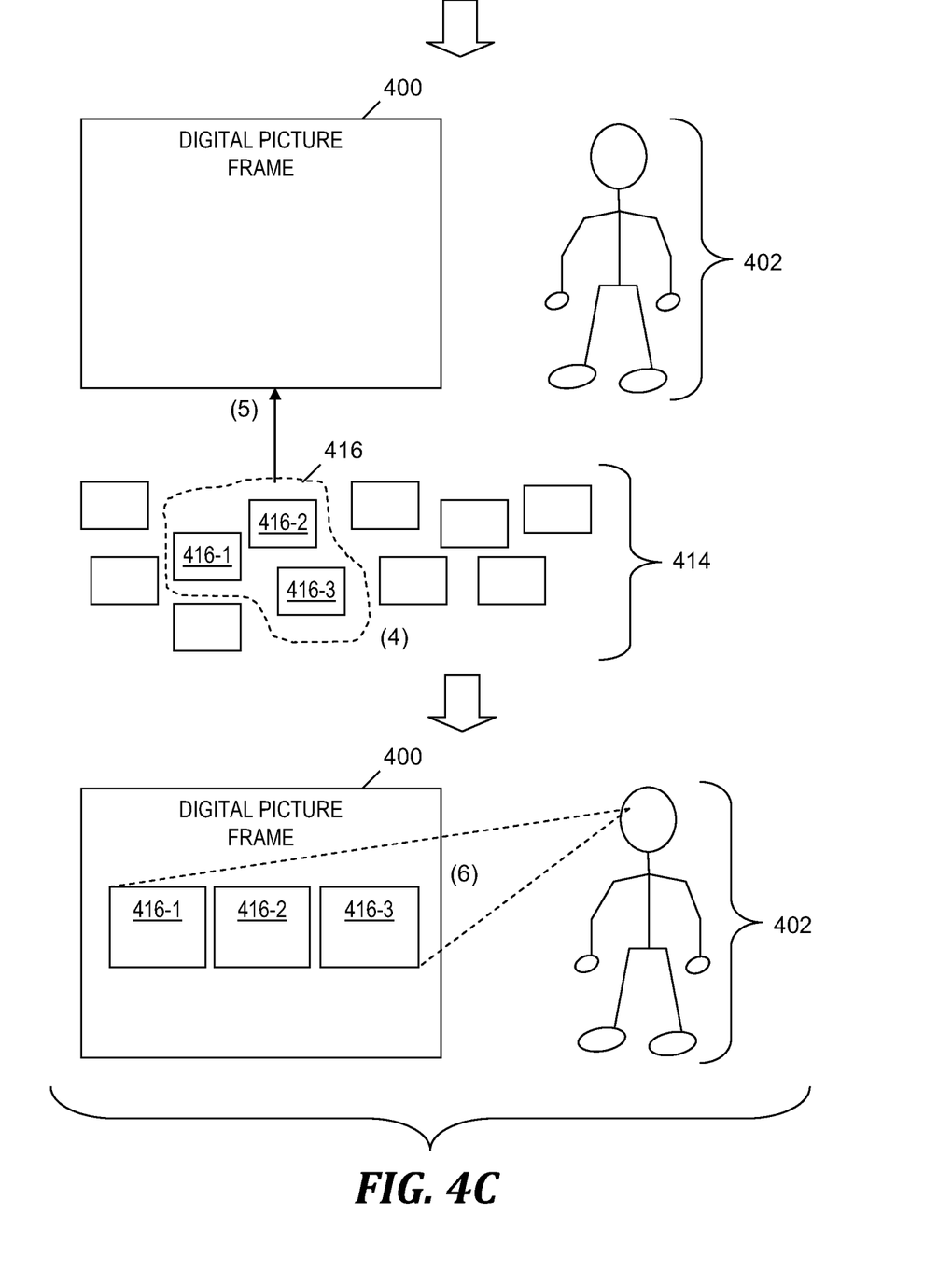

FIGS. 4A-4C depict a six-step example of automatically selecting and displaying images, which utilizes the process of FIG. 2, in accordance with embodiments of the present invention. The steps shown in FIGS. 4A-4C are performed subsequent to the process of FIG. 3. In step (1) in FIG. 4A, a digital picture frame 400 identifies a user 402 by using a video camera 404 and an audio recorder 406. The digital picture frame 400 includes computer 102 (see FIG. 1). Video camera 404 detects the face of user 402 and records an image of the face of user 402, where the image of the face is part of local video sensor data 148 (see FIG. 1). Local video classifier 132 (see FIG. 1) analyzes the characteristics of the image of the face of user 402. Audio recorder 406 detects and records the speech of user 402, where the recorded speech is part of local audio sensor data 150 (see FIG. 1). Audio classifier 134 (see FIG. 1) analyzes the characteristics of the recorded speech of user 402. Local user identification and sentiment engine 110 (see FIG. 1) uses the aforementioned analyses by local video classifier 132 (see FIG. 1) and audio classifier 134 (see FIG. 1) to match the characteristics of the image of the face and the recorded speech to characteristics of a user previously stored in user data repository 114 (see FIG. 1). By matching the characteristics, local user identification and sentiment engine 110 (see FIG. 1) identifies the user. Using the identification of the user, profile manager 124 (see FIG. 1) identifies user profile information 408 stored in user data repository 114 (see FIG. 1), where the user profile information 408 corresponds to the identified user. The identified user profile information 408 includes user preferences. Step (1) in FIG. 4A is included in step 202 in FIG. 2.

In step (2) in FIG. 4A, video camera 404 gathers visual data about the facial expression on the face of user 402. Local video classifier 132 (see FIG. 1) analyzes the gathered visual data and determines that the facial expression of user 402 indicates happiness. Social media classifier 116 (see FIG. 1) gathers and analyzes social media data that is authored by the user, including a social media post 410 whose content indicates that the user is happy. User empathy calculator 128 (see FIG. 1) uses the aforementioned analyses by local video classifier 132 (see FIG. 1) and social media classifier 116 (see FIG. 1) to make a final determination that the current sentiment of the user is an emotional state of happiness. Step (2) in FIG. 4A is included in step 204 in FIG. 2.

In step (3) in FIG. 4B, user empathy calculator 128 (see FIG. 1) in digital picture frame 400 retrieves information from a mood preferences table 412 included in user profile information 408. The information retrieved from mood preferences table 412 indicates an association between the sentiment of the user and sentiments conveyed by images stored in image repository 112 (see FIG. 1). Mood preferences table 412 had been previously input by user 402 via user interface 105 (see FIG. 1) and had been stored by profile manager 124 (see FIG. 1) in step 316 (see FIG. 3). Mood preferences table 412 indicates the user's preference for viewing happy images in response to the user feeling happy or sad and for viewing images that include at least one of the user's favorite people in response to the user feeling happy, said, or mad. Step (3) in FIG. 4B is included in step 206 in FIG. 2.

In step (4) in FIG. 4C, based on the determination in step (2) (see FIG. 4A) that the user is happy and based on the information in mood preferences table 412 (see FIG. 4B) retrieved in step (3) (see FIG. 4B) that indicates that the user who is feeling happy prefers to see happy images and images that include the user's favorite people, user empathy calculator 128 (see FIG. 1) searches a plurality of images 414 stored in image repository 112 (see FIG. 1) and determines that images 416 convey a feeling of happiness and/or include at least one of the user's favorite people. Images 416 includes an image 416-1 which conveys happiness, an image 416-2 which includes one of the favorite people of user 402, and an image 416-3 which conveys happiness and which includes two of the favorite people of user 402. Step (4) in FIG. 4C is included in step 208 in FIG. 2.

In step (5) in FIG. 4C, user empathy calculator 128 (see FIG. 1) selects images 416-1, 416-2, and 416-3 based on the mood preferences table 412 (see FIG. 4B) that associates the user's feeling of happiness with images that convey happiness and images that include at least one of the user's favorite people and based on image 416-1 conveying happiness, image 416-2 including at least one of the user's favorite people, and image 416-3 conveying happiness and including at least one of the user's favorite people. Step (5) in FIG. 4C is included in step 210 in FIG. 2.

In step (6) in FIG. 4C, digital picture frame 400 displays images 416-1, 416-2, and 416-3 so that user 402 views the displayed images. Step (6) in FIG. 4C is included in step 212 in FIG. 2.

Computer System

FIG. 5 is a block diagram of a computer that is included in the system of FIG. 1 and that implements the process of FIG. 2, in accordance with embodiments of the present invention. Computer 102 is a computer system that generally includes a central processing unit (CPU) 502, a memory 504, an input/output (I/O) interface 506, and a bus 508. Computer 102 is coupled to I/O devices 510 and a computer data storage unit 512. CPU 502 performs computation and control functions of computer 102, including executing instructions included in program code 514 for empathetic image selection system 104 (see FIG. 1) to perform a method of automatically selecting and displaying one or more images, where the instructions are executed by CPU 502 via memory 504. CPU 502 may include a single processing unit, or be distributed across one or more processing units in one or more locations (e.g., on a client and server).

Memory 504 includes a known computer readable storage medium, which is described below. In one embodiment, cache memory elements of memory 504 provide temporary storage of at least some program code (e.g., program code 514) in order to reduce the number of times code must be retrieved from bulk storage while instructions of the program code are executed. Moreover, similar to CPU 502, memory 504 may reside at a single physical location, including one or more types of data storage, or be distributed across a plurality of physical systems in various forms. Further, memory 504 can include data distributed across, for example, a local area network (LAN) or a wide area network (WAN).

I/O interface 506 includes any system for exchanging information to or from an external source. I/O devices 510 include any known type of external device, including a display device, keyboard, etc. Bus 508 provides a communication link between each of the components in computer 102, and may include any type of transmission link, including electrical, optical, wireless, etc.

I/O interface 506 also allows computer 102 to store information (e.g., data or program instructions such as program code 514) on and retrieve the information from computer data storage unit 512 or another computer data storage unit (not shown). Computer data storage unit 512 includes a known computer-readable storage medium, which is described below. In one embodiment, computer data storage unit 512 is a non-volatile data storage device, such as a magnetic disk drive (i.e., hard disk drive) or an optical disc drive (e.g., a CD-ROM drive which receives a CD-ROM disk).

Memory 504 and/or storage unit 512 may store computer program code 514 that includes instructions that are executed by CPU 502 via memory 504 to automatically select and display one or more images. Although FIG. 5 depicts memory 504 as including program code 514, the present invention contemplates embodiments in which memory 504 does not include all of code 514 simultaneously, but instead at one time includes only a portion of code 514.

Further, memory 504 may include an operating system (not shown) and may include other systems not shown in FIG. 5.

Storage unit 512 and/or one or more other computer data storage units (not shown) that are coupled to computer 102 may store image repository 112 (see FIG. 1), user data repository 114 (see FIG. 1), social media data 140 (see FIG. 1), calendar data 142 (see FIG. 1), news and media data 144 (see FIG. 1), other data 146 (see FIG. 1), local video sensor data 148 (see FIG. 1), local audio sensor data 150 (see FIG. 1), local light sensor data 152 (see FIG. 1), and local weather sensor data 154 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to automatically selecting and displaying one or more images. Thus, an embodiment of the present invention discloses a process for supporting computer infrastructure, where the process includes providing at least one support service for at least one of integrating, hosting, maintaining and deploying computer-readable code (e.g., program code 514) in a computer system (e.g., computer 102) including one or more processors (e.g., CPU 502), wherein the processor(s) carry out instructions contained in the code causing the computer system to automatically select and display one or more images. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of automatically selecting and displaying one or more images.

While it is understood that program code 514 for automatically selecting and displaying one or more images may be deployed by manually loading directly in client, server and proxy computers (not shown) via loading a computer-readable storage medium (e.g., computer data storage unit 512), program code 514 may also be automatically or semi-automatically deployed into computer 102 by sending program code 514 to a central server or a group of central servers. Program code 514 is then downloaded into client computers (e.g., computer 102) that will execute program code 514. Alternatively, program code 514 is sent directly to the client computer via e-mail. Program code 514 is then either detached to a directory on the client computer or loaded into a directory on the client computer by a button on the e-mail that executes a program that detaches program code 514 into a directory. Another alternative is to send program code 514 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 514 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of automatically selecting and displaying one or more images. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 504 and computer data storage unit 512) having computer readable program instructions 514 thereon for causing a processor (e.g., CPU 502) to carry out aspects of the present invention.

The computer readable storage medium can be a tangible device that can retain and store instructions (e.g., program code 514) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 514) described herein can be downloaded to respective computing/processing devices (e.g., computer 102) from a computer readable storage medium or to an external computer or external storage device (e.g., computer data storage unit 512) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 514) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2 and FIG. 3) and/or block diagrams (e.g., FIG. 1 and FIG. 5) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 514).

These computer readable program instructions may be provided to a processor (e.g., CPU 502) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 512) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 514) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of selecting and displaying one or more images, the method comprising the steps of:
    a computer determining that a user is in a proximity to a digital picture frame that includes the computer;
    in response to the step of determining that the user is in the proximity to the digital picture frame, the computer receiving weather information from a weather sensor coupled to the digital picture frame, the weather information specifying a current weather of a geographic location that includes the digital picture frame;
    in response to the step of determining that the user is in the proximity to the digital picture frame, and based on the current weather of the geographic location that includes the digital picture frame, the computer determining an emotional state of the user;
    based on user profile information corresponding to the user, the computer determining that one or more images included in a plurality of images convey the emotional state of the user; and
    based on the emotional state of the user and the one or more images conveying the emotional state of the user, the computer displaying the one or more images on a display included in the digital picture frame.

2. The method of claim 1, wherein the step of determining the emotional state of the user includes the computer receiving a measurement of ambient lighting of a room in which the digital picture frame is located, the measurement being received from a light sensor coupled to the digital picture frame, wherein the step of determining the emotional state of the user is further based on the measurement of the ambient lighting of the room in which the digital picture frame is located.

3. The method of claim 1, further comprising the step of the computer collecting schedules of events of interest to the user from a calendar service, wherein the step of determining the emotional state of the user is based on the schedules of events of interest to the user collected from the calendar service.

4. The method of claim 1, further comprising the steps of:
    the computer determining that one or more additional users are in the proximity to the digital picture frame;
    in response to the one or more additional users being in the proximity to the digital picture frame, the computer determining one or more emotional states of the one or more additional users, respectively;
    based on the emotional state of the user and the one or more emotional states of the one or more additional users, the computer determining one emotional state of a majority of users in a group of users consisting of the user and the one or more additional users;
    the computer determining an association between the one emotional state of the majority of the users and one sentiment included in a plurality of sentiments conveyed by the plurality of images;
    the computer determining that an image included in the plurality of images conveys the one sentiment;
    based on the association between the one emotional state of the majority of the user and the one sentiment and based on the image conveying the one sentiment, the computer selecting the image from the plurality of images; and
    the computer displaying the image on the display included in the digital picture frame.

5. The method of claim 1, further comprising the step of the computer automatically generating metadata tags for the plurality of images, the metadata tags specifying respective contents of corresponding images included in the plurality of images, wherein the step of determining that the one or more images convey the emotional state of the user includes:
    identifying contents of the one or more images based on the one or more metadata tags generated for the one or more images, the one or more metadata tags being included in the generated metadata tags; and
    identifying the emotional state of the user based on the identified contents of the one or more images.

6. The method of claim 1, further comprising the step of the computer automatically generating metadata tags for the plurality of images, the metadata tags specifying respective sentiments of corresponding images included in the plurality of images, wherein the step of determining that the one or more images convey the emotional state of the user includes identifying the emotional state based on one or more metadata tags generated for the one or more images, the one or more metadata tags being included in the generated metadata tags.

7. The method of claim 1, further comprising the step of the computer identifying a new post authored by the user via a social media service, wherein the step of determining the emotional state of the user includes determining a sentiment based in part on contents of the new post, and wherein the step of displaying the one or more images is further based on the sentiment and the contents of the new post.

8. The method of claim 1, further comprising the step of:
    providing at least one support service for at least one of creating, integrating, hosting, maintaining, and deploying computer-readable program code in the computer, the program code being executed by a processor of the computer to implement the steps of determining that the user is in the proximity to the digital picture frame, receiving the weather information, determining the emotional state of the user, determining that the one or more images convey the emotional state of the user, and displaying the one or more images on the display.

9. A computer program product, comprising:
    a computer-readable storage device; and
    a computer-readable program code stored in the computer-readable storage device, the computer-readable program code containing instructions that are executed by a central processing unit (CPU) of a computer system to implement a method of selecting and displaying one or more images, the method comprising the steps of:
        the computer system determining that a user is in a proximity to a digital picture frame that includes the computer system;
        in response to the step of determining that the user is in the proximity to the digital picture frame, the computer system receiving weather information from a weather sensor coupled to the digital picture frame, the weather information specifying a current weather of a geographic location that includes the digital picture frame;

in response to the step of determining that the user is in the proximity to the digital picture frame, and based on the current weather of the geographic location that includes the digital picture frame, the computer system determining an emotional state of the user;

based on user profile information corresponding to the user, the computer system determining that one or more images included in a plurality of images convey the emotional state of the user; and based on the emotional state of the user and the one or more images conveying the emotional state of the user, the computer system displaying the one or more images on a display included in the digital picture frame.

10. The computer program product of claim 9, wherein the step of determining the emotional state of the user includes the computer system receiving a measurement of ambient lighting of a room in which the digital picture frame is located, the measurement being received from a light sensor coupled to the digital picture frame, wherein the step of determining the emotional state of the user is further based on the measurement of the ambient lighting of the room in which the digital picture frame is located.

11. The computer program product of claim 9, wherein the method further comprises the step of the computer system collecting schedules of events of interest to the user from a calendar service, wherein the step of determining the emotional state of the user is based on the schedules of events of interest to the user collected from the calendar service.

12. The computer program product of claim 9, wherein the method further comprises the steps of:

the computer system determining that one or more additional users are in the proximity to the digital picture frame;

in response to the one or more additional users being in the proximity to the digital picture frame, the computer system determining one or more emotional states of the one or more additional users, respectively;

based on the emotional state of the user and the one or more emotional states of the one or more additional users, the computer system determining one emotional state of a majority of users in a group of users consisting of the user and the one or more additional users;

the computer system determining an association between the one emotional state of the majority of the users and one sentiment included in a plurality of sentiments conveyed by the plurality of images;

the computer system determining that an image included in the plurality of images conveys the one sentiment;

based on the association between the one emotional state of the majority of the user and the one sentiment and based on the image conveying the one sentiment, the computer system selecting the image from the plurality of images; and the computer system displaying the image on the display included in the digital picture frame.

13. The computer program product of claim 9, wherein the method further comprises the step of the computer system automatically generating metadata tags for the plurality of images, the metadata tags specifying respective contents of corresponding images included in the plurality of images, wherein the step of determining that the one or more images convey the emotional state of the user includes:

identifying contents of the one or more images based on the one or more metadata tags generated for the one or more images, the one or more metadata tags being included in the generated metadata tags; and identifying the emotional state of the user based on the identified contents of the one or more images.

14. The computer program product of claim 9, wherein the method further comprises the step of the computer system automatically generating metadata tags for the plurality of images, the metadata tags specifying respective sentiments of corresponding images included in the plurality of images, wherein the step of determining that the one or more images convey the emotional state of the user includes identifying the emotional state based on one or more metadata tags generated for the one or more images, the one or more metadata tags being included in the generated metadata tags.

15. A computer system comprising:
a central processing unit (CPU);
a memory coupled to the CPU; and
a computer readable storage device coupled to the CPU, the computer readable storage device containing instructions that are executed by the CPU via the memory to implement a method of selecting and displaying one or more images, the method comprising the steps of:

the computer system determining that a user is in a proximity to a digital picture frame that includes the computer system;

in response to the step of determining that the user is in the proximity to the digital picture frame, the computer system receiving weather information from a weather sensor coupled to the digital picture frame, the weather information specifying a current weather of a geographic location that includes the digital picture frame;

in response to the step of determining that the user is in the proximity to the digital picture frame, and based on the current weather of the geographic location that includes the digital picture frame, the computer system determining an emotional state of the user;

based on user profile information corresponding to the user, the computer system determining that one or more images included in a plurality of images convey the emotional state of the user; and based on the emotional state of the user and the one or more images conveying the emotional state of the user, the computer system displaying the one or more images on a display included in the digital picture frame.

16. The computer system of claim 15, wherein the step of determining the emotional state of the user includes the computer system receiving a measurement of ambient lighting of a room in which the digital picture frame is located, the measurement being received from a light sensor coupled to the digital picture frame, wherein the step of determining the emotional state of the user is further based on the measurement of the ambient lighting of the room in which the digital picture frame is located.

17. The computer system of claim 15, wherein the method further comprises the step of the computer system collecting schedules of events of interest to the user from a calendar service, wherein the step of determining the emotional state of the user is based on the schedules of events of interest to the user collected from the calendar service.

18. The computer system of claim 15, wherein the method further comprises the steps of:

the computer system determining that one or more additional users are in the proximity to the digital picture frame;

in response to the one or more additional users being in the proximity to the digital picture frame, the computer system determining one or more emotional states of the one or more additional users, respectively;

based on the emotional state of the user and the one or more emotional states of the one or more additional users, the computer system determining one emotional state of a majority of users in a group of users consisting of the user and the one or more additional users;

the computer system determining an association between the one emotional state of the majority of the users and one sentiment included in a plurality of sentiments conveyed by the plurality of images;

the computer system determining that an image included in the plurality of images conveys the one sentiment;

based on the association between the one emotional state of the majority of the user and the one sentiment and based on the image conveying the one sentiment, the computer system selecting the image from the plurality of images; and the computer system displaying the image on the display included in the digital picture frame.

19. The computer system of claim 15, wherein the method further comprises the step of the computer system automatically generating metadata tags for the plurality of images, the metadata tags specifying respective contents of corresponding images included in the plurality of images, wherein the step of determining that the one or more images convey the emotional state of the user includes:

identifying contents of the one or more images based on the one or more metadata tags generated for the one or more images, the one or more metadata tags being included in the generated metadata tags; and identifying the emotional state of the user based on the identified contents of the one or more images.

20. The computer system of claim 15, wherein the method further comprises the step of the computer system automatically generating metadata tags for the plurality of images, the metadata tags specifying respective sentiments of corresponding images included in the plurality of images, wherein the step of determining that the one or more images convey the emotional state of the user includes identifying the emotional state based on one or more metadata tags generated for the one or more images, the one or more metadata tags being included in the generated metadata tags.

* * * * *